United States Patent
Myung

(10) Patent No.: US 9,621,791 B2
(45) Date of Patent: Apr. 11, 2017

(54) IMAGING APPARATUS AND CONTROL METHOD TO SET AN AUTO FOCUS MODE OR AN AUTO PHOTOMETRY MODE CORRESPONDING TO A TOUCH GESTURE

(71) Applicant: SAMSUNG Electronics Co., Ltd., Suwon-si, Gyeonggi-do (KR)

(72) Inventor: Jin-su Myung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 13/940,462

(22) Filed: Jul. 12, 2013

(65) Prior Publication Data
US 2014/0118601 A1  May 1, 2014

(30) Foreign Application Priority Data
Oct. 30, 2012  (KR) .......................... 10-2012-0121358

(51) Int. Cl.
*H04N 5/232* (2006.01)
(52) U.S. Cl.
CPC ..... *H04N 5/23216* (2013.01); *H04N 5/23212* (2013.01); *H04N 5/23245* (2013.01); *H04N 5/23293* (2013.01)
(58) Field of Classification Search
CPC ........... H04N 5/23212; H04N 5/23216; H04N 5/23245; H04N 5/23293
USPC ...................................... 348/333.11, 255, 345
See application file for complete search history.

(56) References Cited

U.S. PATENT DOCUMENTS

| | | | |
|---|---|---|---|
| 8,489,065 B2* | 7/2013 | Green ............. | G08B 13/19689 348/143 |
| 8,837,932 B2* | 9/2014 | Lee ................... | H04N 5/23212 396/125 |
| 8,856,675 B1* | 10/2014 | Agarawala ............ | G06F 3/048 715/777 |
| 2002/0080257 A1* | 6/2002 | Blank ................ | H04N 5/23212 348/345 |
| 2003/0071908 A1* | 4/2003 | Sannoh ............. | H04N 5/23212 348/345 |
| 2006/0072028 A1 | 4/2006 | Hong | |
| 2009/0015703 A1 | 1/2009 | Kim et al. | |

(Continued)

FOREIGN PATENT DOCUMENTS

| | | |
|---|---|---|
| EP | 1873620 | 1/2008 |
| JP | 2011-030008 | 2/2011 |

OTHER PUBLICATIONS

Extended European Search Report dated Apr. 10, 2014 issued in EP Application No. 13189773.8.

(Continued)

*Primary Examiner* — Amy Hsu
(74) *Attorney, Agent, or Firm* — Staas & Halsey LLP

(57) ABSTRACT

An imaging apparatus and a control method thereof includes an image unit adapted to perform imaging, a drive unit adapted to move a location of a lens in the imaging unit to adjust a focus, a touch screen adapted to display a live view generated by the imaging unit and receive a touch gesture for the live view, and a controller adapted to set an auto focus mode corresponding to the touch gesture among a plurality of auto focus modes when the touch gesture is input, and to control the drive unit to move the location of the lens so that the focus can be adjusted based on the set auto focus mode.

20 Claims, 12 Drawing Sheets

(56) References Cited

U.S. PATENT DOCUMENTS

| | | | | |
|---|---|---|---|---|
| 2009/0262211 | A1* | 10/2009 | Mori | G06F 3/0412 348/222.1 |
| 2010/0020222 | A1* | 1/2010 | Jones | G06F 3/04883 348/333.02 |
| 2010/0128145 | A1* | 5/2010 | Pitts | H04N 5/23212 348/231.99 |
| 2010/0201842 | A1 | 8/2010 | Jung et al. | |
| 2010/0208105 | A1* | 8/2010 | Kubota | H04N 5/23219 348/234 |
| 2011/0115945 | A1 | 5/2011 | Takano et al. | |
| 2011/0199639 | A1* | 8/2011 | Tani | G06F 3/04886 358/1.15 |
| 2011/0249079 | A1* | 10/2011 | Santamaria | H04M 7/0057 348/14.02 |
| 2011/0267524 | A1* | 11/2011 | Lee | H04N 5/23212 348/333.01 |
| 2012/0120277 | A1* | 5/2012 | Tsai | H04N 5/23293 348/223.1 |
| 2012/0212661 | A1 | 8/2012 | Yamaguchi et al. | |
| 2012/0307126 | A1* | 12/2012 | Bhogal | H04N 5/23206 348/333.11 |
| 2013/0155276 | A1* | 6/2013 | Ueda | G02B 7/36 348/223.1 |
| 2013/0271637 | A1* | 10/2013 | Park | H04N 5/23216 348/333.11 |

OTHER PUBLICATIONS

Partial European Search Report dated Dec. 9, 2013 issued in EP Application No. 13189773.8.
European Examination Report dated Nov. 8, 2016 in related European Patent Application No. 13189773.8.
"*Touch Gesture Reference Guide*"; Craig Villamor et al.; Apr. 15, 2010; XP055024104; URL:http://web.archive.org/web/20100601214053/http://www.lukew.com/touch/TouchGestureGuide.pdf ; retrieved on Apr. 10, 2012.

* cited by examiner (1)

(2)

(1)

(2)

(1)

(2)

IMAGING APPARATUS AND CONTROL METHOD TO SET AN AUTO FOCUS MODE OR AN AUTO PHOTOMETRY MODE CORRESPONDING TO A TOUCH GESTURE

CROSS-REFERENCE TO RELATED APPLICATIONS

This application claims priority under 35 U.S.C. §119(a) from Korean Patent Application No. 2012-0121358, filed on Oct. 30, 2012, in the Korean Intellectual Property Office, the contents of which are incorporated herein by reference in its entirety.

BACKGROUND OF THE INVENTION

1. Field of the Invention

The present general inventive concept relates to an imaging apparatus and a control method thereof, and more particularly to an imaging apparatus that can set an auto focus mode and a photometry mode, and a control method thereof.

2. Description of the Related Art

Recently released imaging apparatuses commonly have touch screens for convenience of users. Imaging apparatuses support various modes so that optimal photos can be taken in various environments. Among the various modes, a shooting mode, an auto focus (AF) mode and a photometry mode are most frequently used by users. Here, in order to use an AF mode and a photometry mode, it is necessary to take processes of pushing a menu button selecting an AF mode menu or a photometry mode menu, of manipulating a direction key, and then selecting a mode by using the manipulated direction key. Accordingly, there is inconvenience since at least three steps should be performed to select such modes.

Recently released imaging apparatuses have a function of changing AF areas using touch inputs on a live view displayed on a touch screen. However, this function merely allows a user to select performing an AF for a subject displayed in a certain area under a certain AF mode, and does not allow a user to perform an AF mode change. With regard to a photometry mode, such apparatuses should also use a conventional method of pushing a plurality of mechanical buttons several times to select a photometry mode.

Therefore, there is a need for a technique that can allow users to more conveniently select an AF mode and a photometry mode.

SUMMARY OF THE INVENTION

The present general inventive concept provides an imaging apparatus that allows a user to more conveniently select an AF mode and a photometry mode, a control method thereof, and a computer-readable medium.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an imaging apparatus including an image unit having a lens to perform imaging, a drive unit to move a location of the lens in the imaging unit to adjust a focus, a touch screen unit to display a live view generated by the imaging unit and receive a touch gesture for the live view, and a controller configured to set an auto focus mode corresponding to the touch gesture among a plurality of auto focus modes if the touch gesture is input in an auto focus setting mode, and to control the drive unit to adjust the focus according to the set auto focus mode.

The controller may control the drive unit to automatically adjust the focus based on the live view image in an area where the touch gesture is performed.

The controller may set a multi section auto focus mode among the plurality of auto focus modes if a pinch-out gesture is input on the live view, and may control the drive unit to automatically adjust the focus based on a certain object on an image of the live view displayed in an area defined by the pinch-out gesture.

The controller may set a track auto focus mode among the plurality of auto focus modes if a drag gesture is input on the live view, and may control the drive unit to automatically adjust the focus while tracking an object defined by the drag gesture.

The auto focus mode may comprise at least one of a center auto focus mode, a multi section auto focus mode, a track auto focus mode and a selection auto focus mode.

The foregoing and/or other features and utilities of the present general inventive concept may also be achieved by providing an imaging apparatus including an image unit having a lens to perform imaging, a drive unit to move a location of the lens in the imaging unit to adjust a focus, a touch screen unit to display a live view image generated by the imaging unit and receive a touch gesture for the live view image, and a controller configured to set multi section auto focus mode if a single-point fix pinch-out gesture is input among the touch gesture in a shooting mode, and to control the drive unit to automatically adjust the focus based on a certain object on the live view image displayed in an area defined by the single-point fix pinch-out gesture.

The foregoing and/or other features and utilities of the present general inventive concept may also be achieved by providing an imaging apparatus including an image unit to perform imaging, an exposure meter unit to measure intensity of light incident on the image unit, a touch screen unit to display a live view image generated by the imaging unit and receive a touch gesture for the live view image, and a controller configured to set an auto photometry mode corresponding to the touch gesture among a plurality of auto photometry modes if the touch gesture is input in an auto photometry setting mode, and to control the exposure meter to measure intensity of light for a selected area according to the set auto photometry mode.

The controller may set a whole photometry mode among the plurality of photometry modes if a pinch-out gesture is input on the live view, and may control the exposure meter to measure intensity of light incident on an area defined by the pinch-out gesture.

The controller may set a center priority photometry mode among the plurality of photometry modes if a pinch-in gesture is input on the live view, and may control the exposure meter to measure intensity of light incident on a center area pre-set on the live view.

The auto photometry mode may comprise at least one of a whole photometry mode, a center priority photometry mode and a spot photometry mode.

The foregoing and/or other features and utilities of the present general inventive concept may also be achieved by providing a method of controlling an imaging apparatus including displaying a live view image generated by an imaging unit and receiving a touch gesture for the live view image, and adjusting a focus by setting an auto focus mode corresponding to the touch gesture among a plurality of auto focus modes if the touch gesture is input in an auto focus setting mode, and moving a location of a lens to adjust the focus according to the set auto focus mode.

The adjusting the focus may include moving the location of the lens to automatically adjust the focus based on the live view image in an area where the touch gesture is performed.

The adjusting the focus may include setting a multi section auto focus mode among the plurality of auto focus modes if a pinch-out gesture is input on the live view, and moving the location of the lens to automatically adjust the focus based on a certain object on the live view displayed in an area defined by the pinch-out gesture.

The adjusting the focus may include setting a track auto focus mode among the plurality of auto focus modes if a drag gesture is input on the live view image, and moving the location of the lens to automatically adjust the focus while tracking an object defined by the drag gesture.

The auto focus mode may comprise at least one of a center auto focus mode, a multi section auto focus mode, a track auto focus mode and a selection auto focus mode.

The foregoing and/or other features and utilities of the present general inventive concept may also be achieved by providing a method of controlling an imaging apparatus, the method including displaying a live view image generated by an imaging unit and receiving a touch gesture for the live view image, and adjusting a focus by setting a multi section auto focus mode if a single-point fix pinch-out gesture is input among the touch gesture in a shooting mode, and moving a location of a lens to automatically adjust the focus based on a certain object on the live view image displayed in an area defined by the single-point fix pinch-out gesture.

The foregoing and/or other features and utilities of the present general inventive concept may also be achieved by providing a method of controlling an imaging apparatus, the method including displaying a live view image generated by an imaging unit and receiving a touch gesture for the live view image, and automatically measuring light by setting an auto photometry mode corresponding to the touch gesture among a plurality of auto photometry modes if the touch gesture is input in an auto photometry setting mode, and measuring intensity of light for a selected area according to the set auto photometry mode.

The automatically measuring light may include setting a whole photometry mode among the plurality of photometry modes if a pinch-out gesture is input on the live view image, and measuring intensity of light incident on an area defined by the pinch-out gesture.

The automatically measuring light may include setting a center priority photometry mode among the plurality of photometry modes if a pinch-in gesture is input on the live view, and measuring intensity of light incident on a center area pre-set on the live view image.

The auto photometry mode may include at least one of a whole photometry mode, a center priority photometry mode and a spot photometry mode.

The foregoing and/or other features and utilities of the present general inventive concept may also be achieved by providing a computer-readable medium to contain computer-readable codes as a program to execute a method described above or hereinafter.

The foregoing and/or other features and utilities of the present general inventive concept may also be achieved by providing an imaging apparatus, including an imaging unit having a lens to perform an imaging operation, a display unit having a touch panel to display a live view image of the imaging operation of the imaging unit and to detect a user gesture on the live view image, and a controller configured to set one of an auto focusing mode and an auto photometry mode according to the detected user gesture of the touch panel.

The controller may control the imaging unit according to the detected user gesture on the live view image to adjust the imaging operation of the imaging unit such that a characteristic of a subject included the live view image is adjusted.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
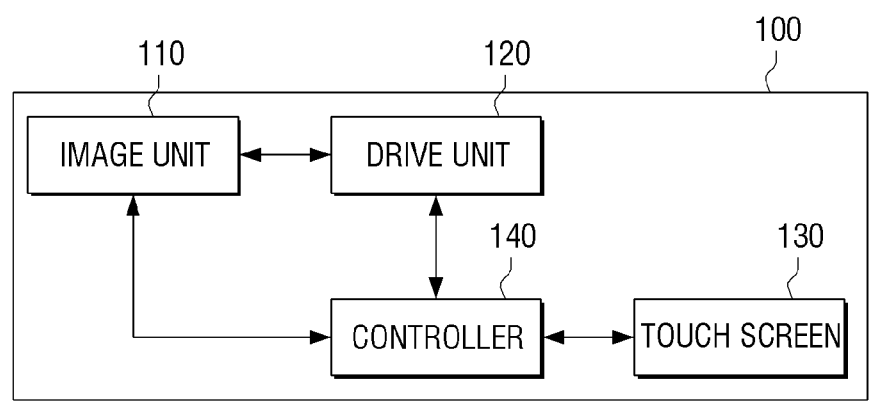
FIGS. 1 to 3 are block diagrams illustrating an imaging apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an imaging apparatus 100 to set an auto focus mode according to an exemplary embodiment of the present general inventive concept.

Referring to FIG. 1, the imaging apparatus (100) includes an image unit 110, a drive unit 120, a touch screen 130 and a controller 140. The image unit 110 collects light received via a lens and senses an image according to the collected light. The image unit 110 includes a lens module such as a lens and an image sensor. The lens can be moved forward and backward within a predetermined range on an axis in a straight line with the image sensor to take a focus (perform a focusing operation). The straight axis between the lens and the image sensor may be referred to as an optical axis. The lens can be adjusted by moving the lens module or moving a lens unit coupled to a main tube to perform the focusing operation. The focusing operation can be manually performed by a user. In addition, the focusing operation can be automatically performed by an electric signal applied to the drive unit 120. This is referred to as an auto focusing (AF) to take a focus automatically.

The drive unit 120 may adjust a location of a lens to automatically take the focus. According to an exemplary embodiment, the drive unit 120 may include a coil therein. If a current is applied to the coil in the drive unit 120, an electric field is generated around the coil, and the electric field and the magnetic field, generated by a magnetic substance, interact with each other so that a driving force is generated in the direction of the optical axis. A movement distance of the lens is determined based on the intensity of the current applied to the coil such that a focus distance is adjusted. The drive unit 120 may include a sensor unit to detect a phase (or location) of the lens. If a control signal for AF is input, the control signal is transferred to the drive unit 120 according to a pre-stored algorithm, and the location of the lens is controlled accordingly.

The touch screen 130 displays a live view generated by the image unit 110 on a screen thereof, and receives a touch gesture on the live view from a user. If a pre-set user's gesture is input in an AF setting mode, an AF mode corresponding to the user's gesture is set.

If a touch gesture is input from a user in an AF setting mode, the controller 140 sets an AF mode corresponding to the touch gesture among a plurality of AF modes. The controller 140 controls the drive unit 120 to move the location of the lens so as to adjust the focus according to the set AF mode. Auto focus is performed by adjusting the lens based on the set AF mode and a designated area. Accordingly, the controller 140 may control the drive unit 120 to automatically adjust the focus based on a live view image of the area where the touch gesture is conducted. A more detailed explanation of the AF mode and user's gesture corresponding to the AF mode will be explained later.

Figure 2:
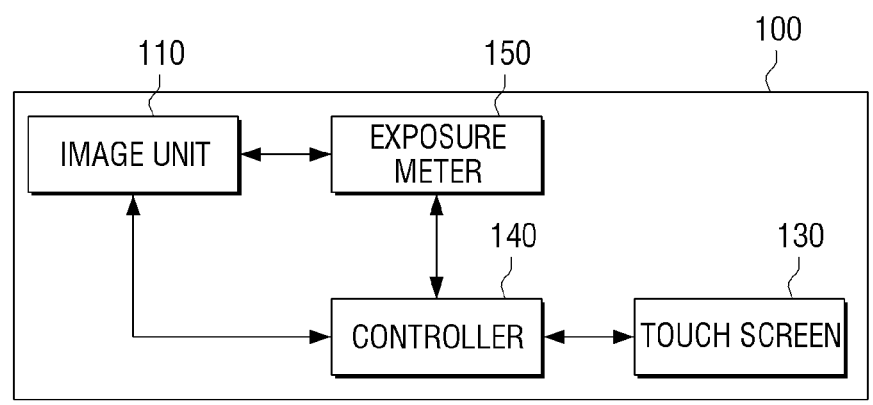

FIG. 2 is a block diagram illustrating an imaging apparatus 100 to set an auto photometry mode according to an exemplary embodiment of the present general inventive concept.

Referring to FIG. 2, the imaging apparatus 100 includes an image unit 110, a touch screen 130, a controller 140 and an exposure meter unit 150. The image unit 110 collects light input via a lens and senses an image. The image unit 110 includes an aperture and a shutter. The aperture may adjust an amount of light which is incident via a lens according to a degree (or size) of opening of the aperture based on a control signal of the controller 140 and/or the exposure meter unit 150. The shutter may adjust the amount of light which is incident via the lens according to a shutter speed of the image unit 110.

The touch screen 130 displays a live view generated by the image unit 110, and receives a touch gesture on the live view from a user. If a pre-set user's gesture is input in a photometry setting mode, a photometry mode corresponding to the user's gesture is set.

If a touch gesture is input from a user in a photometry setting mode, the controller 140 sets an auto photometry mode corresponding to the touch gesture among a plurality of AF modes. The controller 140 controls the exposure meter unit 150 to measure the intensity of light for a selected area according to the set auto photometry mode. A more detailed explanation of the auto photometry mode and user's gesture corresponding to the auto photometry mode will be explained later. The touch screen 130 may be referred to a touch screen unit or a display unit to display an image on a screen thereof. It is possible that the touch screen 130 can be referred as an input and output unit to display an image being photographed and/or an image of a user interface and to receive a user input through the displayed image to control the displayed image and/or a menu to control a function (operation) of the imaging apparatus 100.

The exposure meter unit 150 measures the intensity of light projected on or reflected from a subject or objects around the subject. In order to take a photograph, adjusting of the light may need to be conducted so that an appropriate amount of light can be incident on an image sensor, and the exposure meter unit 150 measures the amount (or intensity) of the light and gives information thereon. Namely, it is necessary to appropriately adjust the degree of exposure in order to take a photograph.

In other words, it is necessary to measure the intensity of light which is incident on the imaging apparatus 100 from a subject. The exposure meter unit 150 measures the intensity of light needed to set an appropriate shutter speed or an aperture opening value of the image unit 110.

Figure 3:
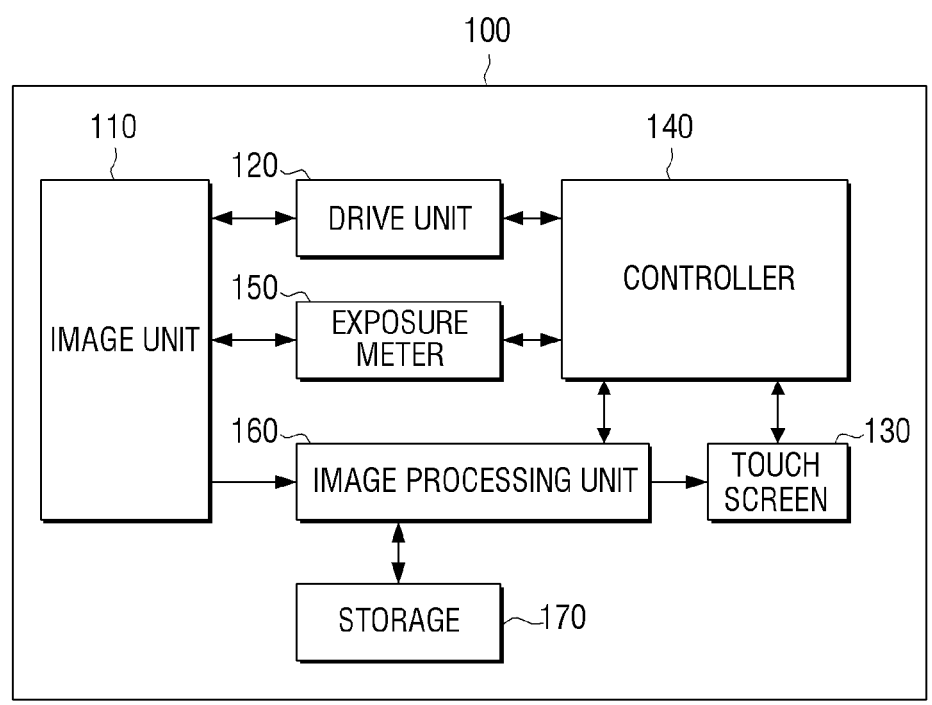

FIG. 3 is a block diagram illustrating an imaging apparatus 100 to set an auto focus mode and an auto photometry mode according to an exemplary embodiment of the present general inventive concept.

FIGS. 1 and 2 illustrate only the configuration for individual modes of the auto focus mode and the auto photometry mode for convenience of explanation. However, an imaging apparatus may set both an auto focus mode and an auto photometry mode.

Referring to FIG. 3, the imaging apparatus 100 may include an image unit 110, a drive unit 120, a touch screen 130, a controller 140, an exposure meter unit 150, an image processing unit 160 and a storage 170. As described above, the image unit 110 includes a lens module including a lens, an image sensor, an aperture and a shutter, and collects light received via a lens and senses an image.

The drive unit 120 may adjust a location of a lens with respect to a reference line of the image unit 110 to automatically perform a focusing operation. The exposure meter unit 150 measures the intensity of light projected on or reflected from a subject or objects around the subject. The touch screen 130 displays a live view generated by the image unit (110), and receives a touch gesture on the live view from a user. If a pre-set user's gesture is input in an AF setting mode, an AF mode corresponding to the user's gesture is set. If a pre-set user's gesture is input in a photometry setting mode, a photometry mode corresponding to the user's gesture is set.

An AF setting mode or a photometry setting mode may be converted by using a physical button or a soft button. For example, a mode change button may be implemented as the physical button on one side of a body (housing) of an imaging apparatus 100. A user may recursively select a shooting mode, an AF setting mode and a photometry setting mode by pushing the corresponding button. The touch screen 130 may display the mode corresponding to the pushed button so that a user can recognize the mode.

On the other hand, a mode conversion soft button may be displayed on the touch screen 130. For example, the imaging apparatus 100 may display an "AF/photometry setting mode" button on one side of the touch screen 130 and recursively change a shooting mode, an AF setting mode and a photometry setting mode as a user pushes or selects a button. The mode conversion soft button may be always displayed on the touch screen 130. However, the mode conversion soft button may not be displayed on the touch screen 130 until a predetermined detection of a user with respect to the touch screen 130. That is, the mode conversion soft button may be displayed only when a user object (for example, fingers or pens) approaches the touch screen 130, without being displayed in a normal state of the touch screen 130.

If a user inputs a double tap gesture in an AF setting mode or a photometry setting mode, the imaging apparatus 100 may be converted to a shooting mode.

Meanwhile, if a pre-set gesture is input in a shooting mode, a pre-set AF mode corresponding to the gesture may be selected. The detailed method will be explained later. If a user selects an AF mode in an AF setting mode, the imaging apparatus 100 may determine a screen luminance of the live view or an appropriate exposure degree by applying the selected AF mode and the photometry mode determined when the AF mode is selected. In other words, if an AF mode is selected in an AF setting mode, the controller 140 may perform operations corresponding to the selected AF mode and the set auto photometry mode which may be linked to each other.

If a touch gesture is input from a user, the controller 140 sets an AF mode or an auto photometry mode corresponding to the touch gesture among a plurality of AF modes or auto photometry modes. The controller 140 controls the drive unit 120 to move the location of the lens so as to adjust the focus according to the set AF mode, and controls the exposure meter unit 150 to measure the intensity of light for the selected area according to the set auto photometry mode.

The image processing unit 160 passes the image generated by the image unit 110 so that a live view screen can be displayed on a display unit of the touch screen 130. When imaging (photographing) is performed, an image at a time when an input of an imaging command is received is captured as a still image, or a moving image is processed according to a moving image shooting command.

The storage 170 stores the captured still image or the moving image. The storage 170 may be, for example, at least one type of a storage medium among a hard disk type, a multimedia card, flash memory type, micro type, SD card, XD card and the like. In addition, the storage 170 may be a RAM or ROM in the controller 140.

<An Exemplary Embodiment of Setting an AF Mode>

FIGS. 4-7 are views illustrating a method of selecting an AF mode in an imaging apparatus 100 according to an exemplary embodiment of the present general inventive concept.

Figure 4:
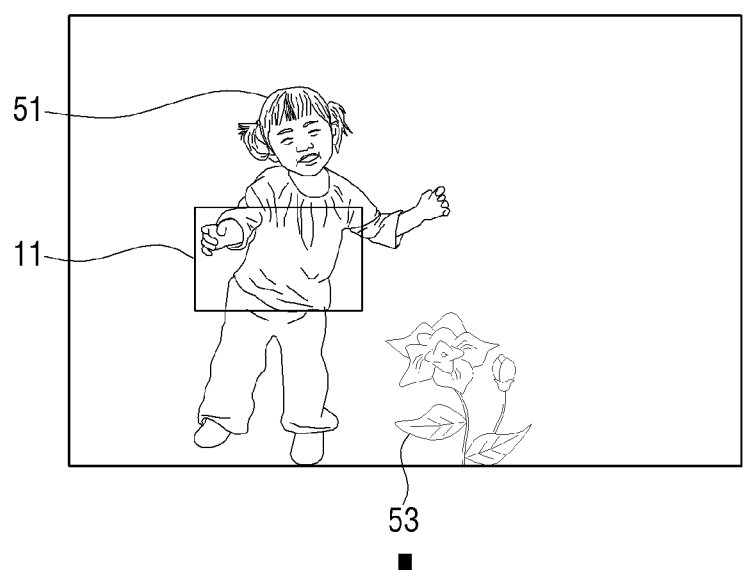
FIGS. 4-7 are views illustrating a method of selecting an AF mode according to an exemplary embodiment of the present general inventive concept.
Figure 4:
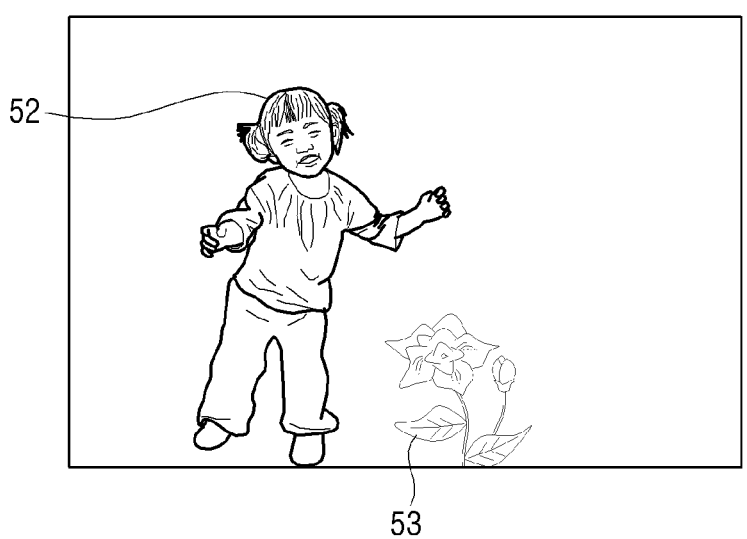

FIG. 4 illustrates a live view displayed on a touch screen 130. The live view contains one or more subjects. In a first view (1) of FIG. 4, there are two subjects of a human 51 and a flower 53. The imaging apparatus 100 is in an AF setting mode. A user may set one among a plurality of AF modes by using a touch gesture on the touch screen 130. The imaging apparatus 100 controls a drive unit 120 to move a location of one or more lenses so that a focus is adjusted with respect to a designated area according to the set AF mode. Auto focus is taken by adjusting the lens based on the set AF mode and the designated area.

Referring to the first view (1) of FIG. 4, a user selects an area of the human 51. As one example, if a user selects one area of the live view on the touch screen 130, a selection AF mode may be set. The selection AF mode means a mode of adjusting an AF based on the subject included in the selected particular area of the live view of the touch screen 130.

A second view (2) of FIG. 4 illustrates a live view in which a selection AF mode is set, and the focus is adjusted according to the selection AF mode. Referring to the second view (2) of FIG. 4, there is a human 52, which is a subject, in the area selected by a user, and thus the imaging apparatus 100 adjusts the AF based on the human 52. Accordingly, the touch screen 130 displays a live view focusing on the human 52, and if a shooting is performed in this state, an image focusing on the human 52 is captured, processed, displayed, and/or recorded in the imaging apparatus 100.

For example, a plurality of AF modes may include at least one of a center AF mode, a multi section AF mode, a track AF mode and a selection AF mode. The center AF mode means a mode automatically focusing on a subject on a center of a live view displayed on the touch screen 130. The multi section AF mode means a mode of automatically focusing on a subject selected by the imaging apparatus (100) in an entire screen or a selected entire area. The track AF mode means a mode of selecting a moving subject on a live view and automatically focusing on the selected moving subject. The selection AF mode means a mode of automatically focusing on a subject at the selected point. The aforementioned AF modes are exemplary embodiments and various AF modes may be set. When an imaging menu is implemented, the imaging apparatus 100 may be initially set as a center AF mode or a multi section AF mode.

Figure 5:
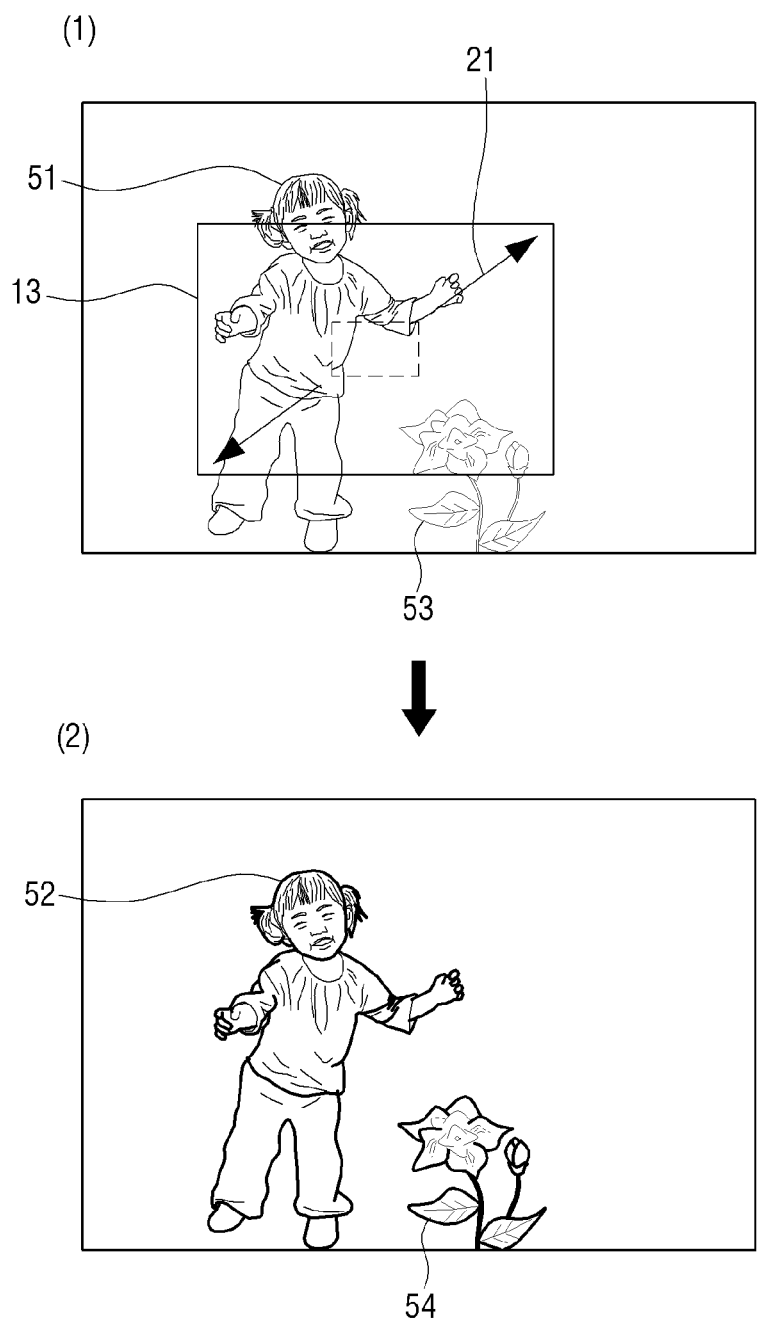

FIG. 5 illustrates a method of selecting a multi section AF mode in an imaging apparatus 100 according to an exemplary embodiment of the present general inventive concept.

A first view (1) of FIG. 5 illustrates a live view to display a human 51 and a flower 53, which are subjects, on a touch screen 130. A pinch-out gesture 21 to expand two touch points to the left and right is input on the touch screen 130. For example, the pinch-out gesture 21 may correspond to a multi section AF mode among a plurality of AF modes. An imaging apparatus 100 may display an AF area 13 corresponding to the pinch-out gesture 21 so that a user can recognize the AF area.

A second view (2) of FIG. 5 illustrates a screen (or live view) in which a multi section AF mode corresponding to the pinch-out gesture 21 of a user is set. As explained above, the multi section AF mode means a mode of automatically focusing on a subject selected by an imaging apparatus (100) in the selected whole area. Accordingly, the imaging apparatus 100 automatically focuses on a human 52 and a flower 54, which are subjects in the AF area 13, according to the set multi section AF mode.

Figure 6:
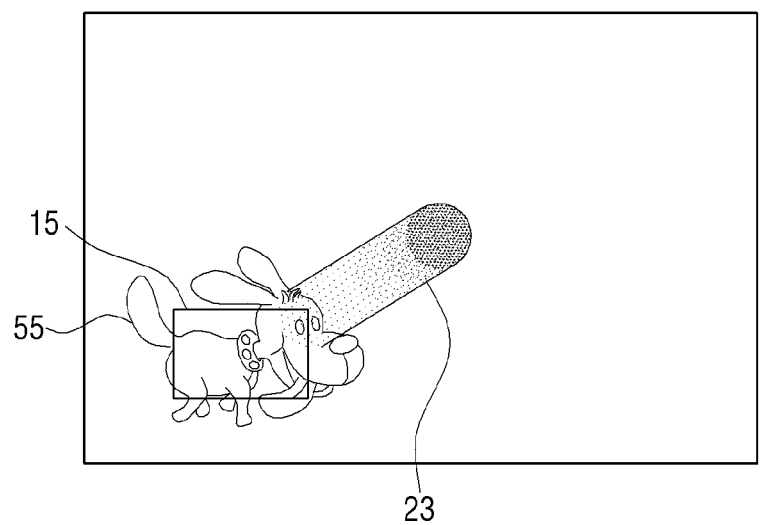
Figure 6:
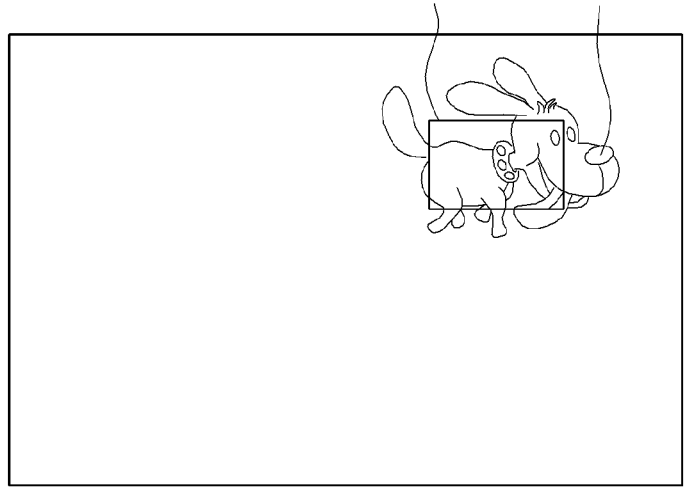

FIG. 6 illustrates a method of selecting a track AF mode in an imaging apparatus 100 according to an exemplary embodiment of the present general inventive concept.

A first view (1) of FIG. 6 illustrates a live view displaying a puppy 55, which is a subject, on a touch screen 130. A drag gesture 23 to drag one touch point to another point is input on the touch screen 130. For example, the drag gesture 23 may correspond to a track AF mode among a plurality of AF modes. The imaging apparatus 100 may display an AF area 15 corresponding to the drag gesture 23 so that a user can recognize the AF area. That is, the AF area (15) is displayed on a point initially touched by a user, and the AF area 15 may be moved to another area where the puppy 55 is displayed to correspond to the drag gesture 23. If the drag gesture 23 is input, the controller 140 sets a track AF mode. At this time, the controller 140 controls the drive unit 120 to focus on a subject, i.e., the puppy 55, included in the finally moved AF area 15.

A second view (2) of FIG. 6 illustrates a view focusing on the puppy 55. Although the puppy 55 keeps moving from a location to another location, the track AF mode tracks a moving subject to adjust an AF, and thus the imaging apparatus 100 tracks the moving puppy 55 and adjusts the AF with respect to the moving subject of the puppy 55.

In general, a user should select an AF setting mode to select an AF mode. However, a pre-set AF mode may be selected in a shooting mode by using a pre-set gesture.

Figure 7:
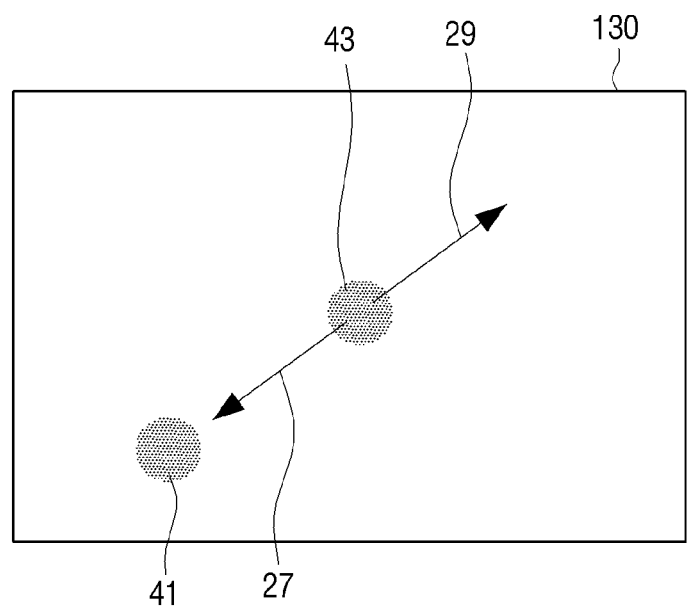

FIG. 7 illustrates a method of setting an AF mode in a shooting mode in an imaging apparatus 100 according to an exemplary embodiment of the present general inventive concept.

Referring to FIG. 7, the imaging apparatus 100 is set as a shooting mode. If a user inputs a single-point fix pinch-in gesture 27 in a shooting mode, the imaging apparatus 100 sets a center AF mode. The single-point fix pinch-in gesture 27 means a gesture in which one touch point 41 of two points 41 and 43 touched on a touch screen 130) is fixed and only the other touch point 43 approaches the fixed touch point 41. The single-point fix pinch-in gesture 27 is the same as the pinch-in gesture in terms of the whole gesture, but is different therefrom in that one touch point is fixed. In general, if a user inputs a pinch-in gesture in a shooting mode, the imaging apparatus 100 performs a zoom-out operation. However, if a user inputs a single-point fix pinch-in gesture, the imaging apparatus 100 may set a center AF mode in a shooting mode.

On the contrary, if a user inputs a single-point fix pinch-out gesture 29, the imaging apparatus 100 sets a multi section AF mode. The single-point fix pinch-out gesture 29 means a gesture in which one touch point 41 between two points 41 and 43 touched on the touch screen 130 is fixed and only the other touch point 43 gets far from the fixed touch point 41. It is possible that a user may simply set a center AF mode or a multi section AF mode in a shooting mode without selecting an AF setting mode.

The aforementioned gestures and AF modes are merely exemplary embodiments, and other gestures may correspond thereto or other AF modes may be set. For example, if a user inputs a gesture rotating clockwise on the touch screen 130, the imaging apparatus 100 sets a multi section AF mode, and if a user inputs a gesture rotating counterclockwise, the imaging apparatus 100 may set a center AF mode.

<An Exemplary Embodiment of Setting an Auto Photometry Mode>

Figure 8:
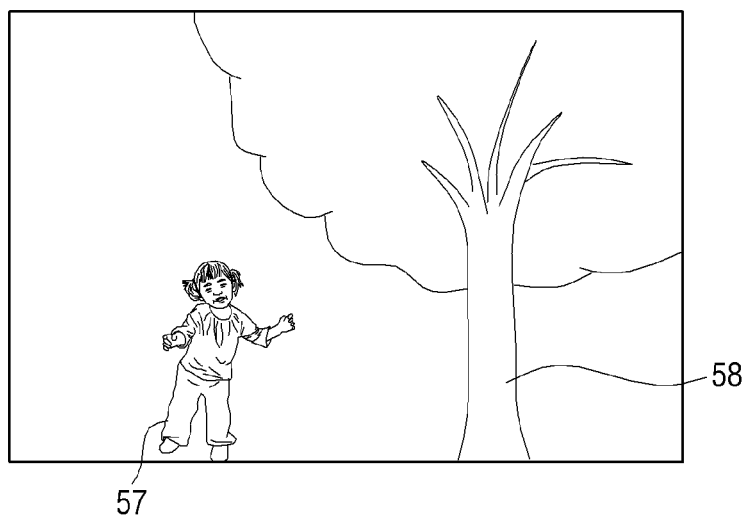
FIGS. 8 and 9 are views illustrating a method of selecting a photometry mode according to an exemplary embodiment of the present general inventive concept.
Figure 9:
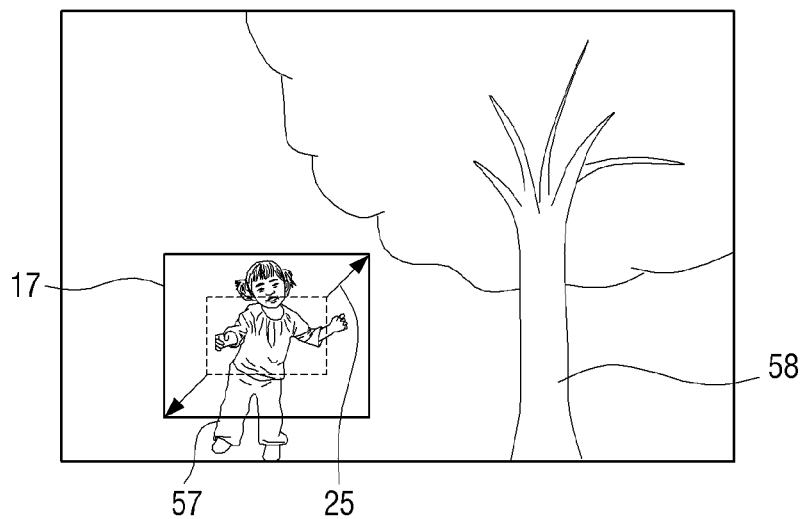
Figure 9:
Figure 9:
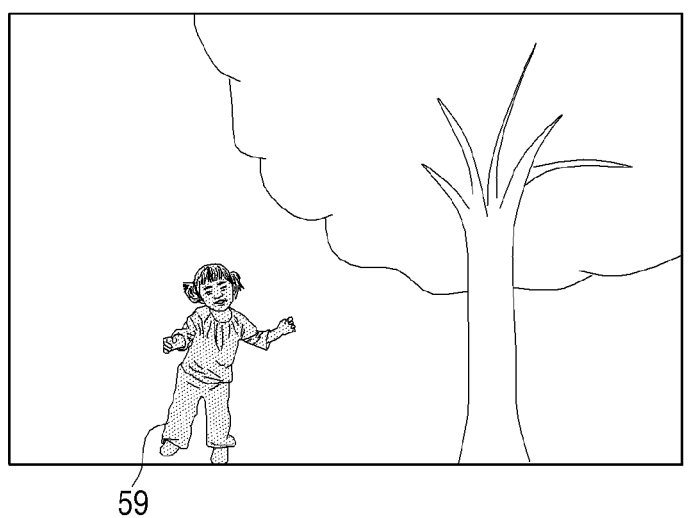

FIGS. 8 and 9 illustrate a method of selecting a photometry mode in an imaging apparatus 100 according to an exemplary embodiment of the present general inventive concept.

FIG. 8 illustrates a photometry method. FIG. 8 illustrates a live view displayed on a touch screen 130. The live view contains one or more subjects. In FIG. 8, there are two subjects of a human 57 and a tree 58. The imaging apparatus 100 is in a photometry setting mode.

For example, the auto photometry mode may include at least one of a whole photometry mode, a center priority photometry mode and a spot photometry mode. The whole photometry mode is a mode of averaging an amount (or intensity) of light which is incident on a whole screen to determine a degree of exposure. The center priority photometry mode is a mode of measuring an amount of light of a certain area of the center according to a priority on respective areas to determine the degree of exposure. According to an exemplary embodiment, the imaging apparatus 100 may divide a screen into nine equal parts or twenty-five equal parts and measure 70% of the light in the center area and 30% of light in the other areas to determine the degree of exposure.

The spot photometry mode is a mode of measuring the amount of light in an area selected by a user according to a priority on one or more areas to determine the degree of exposure. A part photometry mode is a mode of determining the degree of exposure in a similar manner as the spot photometry mode. However, the part photometry mode measures light in a broader scope than the spot photometry mode to determine the degree of exposure. According to an exemplary embodiment, the spot photometry mode may meter (measure or consider) light based on the luminance of about 3% of the selected area, and a part photometry mode may meter (measure or consider) light based on the luminance of about 10% of the selected area. On the other hand, the spot photometry mode may meter light for the area of a selected point, and the part photometry mode may meter light for a selected area of a predetermined size. The aforementioned photometry mode and photometry methods are merely exemplary embodiments, and manufacturers or users may set photometry methods in various manners.

FIG. 9 is a view illustrating a method of selecting a whole photometry mode in an imaging apparatus 100 according to an exemplary embodiment of the present general inventive concept.

A first view (1) of FIG. 9 illustrates a live view to display a human 57 and a tree 58, which are subjects. A pinch-out gesture 25 to expand two touch points to the left and right is input on a touch screen 130. For example, the pinch-out gesture 25 may correspond to a whole photometry mode among a plurality of auto photometry modes. The imaging apparatus 100 may display a photometry area 17 corresponding to the pinch-out gesture 25 so that a user can recognize the photometry area.

A second view (2) of FIG. 9 illustrates a screen (live view) in which a whole photometry mode corresponding to the pinch-out gesture 25 of a user is set. The whole photometry mode means a mode of averaging an amount (or intensity) of light which is incident on the whole screen to determine the degree of exposure. Accordingly, the imaging apparatus 100 averages the amount of light in a bright area and a dark area to determine an appropriate degree of exposure therefore. Accordingly, a human 59 is displayed relatively darker that the human 57 and a tree 58 of the second view of FIG. 9 is displayed relatively brighter than the human 59 and/or the tree 58 of the first view of FIG. 9.

To a live view displayed on the touch screen 130, an auto exposure (AE) value is applied. However, in order to apply the AE value, an imaging apparatus 100 uses the amount of light measured by the exposure meter as the criteria.

The configuration and detailed embodiments of an imaging apparatus that can select a plurality of AF modes and a plurality of auto photometry modes have been explained. Hereinafter, a flowchart of a method of selecting each mode will be explained.

Figure 10:
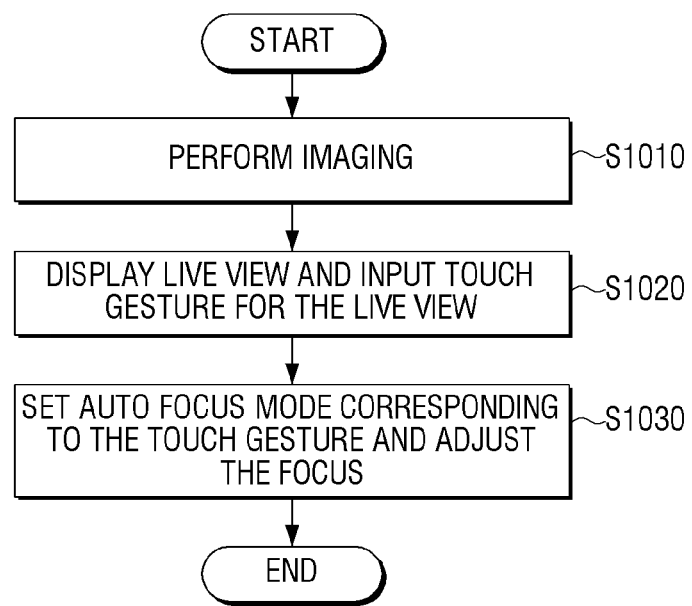
FIG. 10 is a flowchart illustrating a method of selecting an AF mode according to an exemplary embodiment of the present general inventive concept.

FIG. 10 is a flowchart illustrating a method of selecting an AF mode in an imaging apparatus according to an exemplary embodiment of the present general inventive concept.

Referring to FIG. 10, the imaging apparatus performs imaging at operation S1010. The imaging apparatus displays a live view generated by an image unit, and receives a touch gesture for the live view at operation S1020. The imaging apparatus may transmit the live view generated by the image unit to an image processing unit to display the live view on a touch screen. The imaging apparatus may include a physical button to select an AF mode or an auto photometry mode. On the other hand, the imaging apparatus may display a soft button on the touch screen. For example, a user may recursively change a shooting mode, an AF setting mode and a photometry setting mode by pushing the button. At this time, the touch screen 130 may display the corresponding mode so that a user can recognize the mode. A user may set the imaging apparatus as an AF setting mode. For example, a touch gesture may comprise a pinch-out gesture, a pinch-in gesture, a single touch gesture and a drag gesture. A plurality of AF modes may comprise at least one of a multi section AF mode, a center AF mode, a selection AF mode and a track AF mode.

If a touch gesture is input, an AF mode corresponding to the touch gesture among a plurality of AF modes is set, and the location of a lens is moved to adjust the focus according to the set AF mode at operation S1030.

Figure 11:
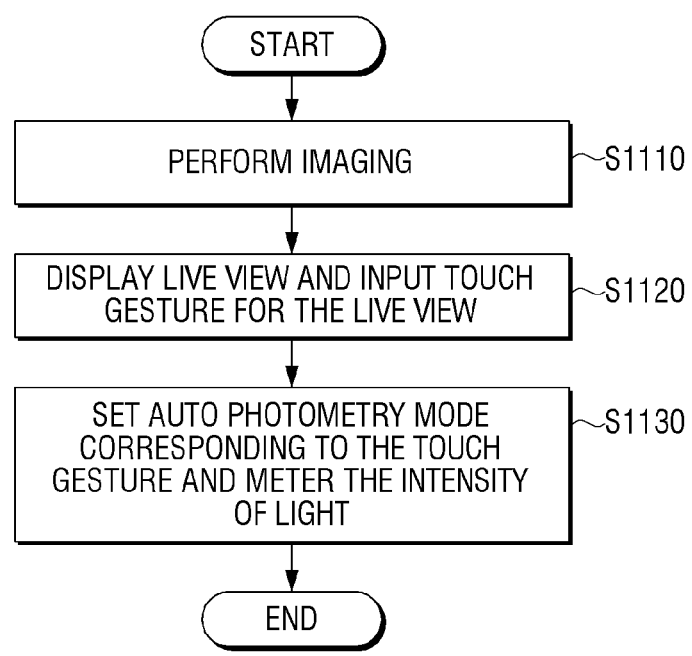
FIG. 11 is a flowchart illustrating a method of selecting a photometry mode according to an exemplary embodiment of the present general inventive concept.

FIG. 11 is a flowchart illustrating a method of selecting a photometry mode in an imaging apparatus according to an exemplary embodiment of the present general inventive concept.

Referring to FIG. 11, the imaging apparatus performs imaging (photographing) at operation S1110. The imaging apparatus displays a live view generated by an image unit, and receives a touch gesture for the live view at operation S1120. The imaging apparatus may comprise a physical button to select an AF mode or an auto photometry mode. On the other hand, the imaging apparatus may display a soft button on the touch screen. For example, a user may set the imaging apparatus as a photometry setting mode. For example, a touch gesture may comprise a pinch-out gesture, a pinch-in gesture, a single touch gesture and a drag gesture. A plurality of auto photometry modes may comprise at least one of a center priority photometry mode, a spot photometry mode and a whole photometry mode.

If a touch gesture is input, an imaging apparatus sets an auto photometry mode corresponding to the touch gesture among a plurality of photometry modes, and automatically meters light by metering the intensity of light for the selected area according to the set auto photometry mode at operation S1130.

Although a user inputs identical gestures, different functions are performed based on the set modes. For example, if a user inputs a pinch-in or pinch-out gesture in a shooting mode, an imaging apparatus performs a zoom-out or zoom-in operation, respectively. If a pinch-in or pinch-out gesture is input in an AF setting mode, an imaging apparatus sets a center AF mode or multi section AF mode, respectively. In addition, if a user inputs a pinch-in or pinch-out gesture in a photometry setting mode, an imaging apparatus sets a center priority photometry mode or whole photometry mode, respectively. A user's drag gesture or touch gesture also performs different operations based on the set modes of the imaging apparatus. Hereinafter, a method of selecting an AF mode and a photometry mode according to exemplary embodiment will be explained.

Figure 12:
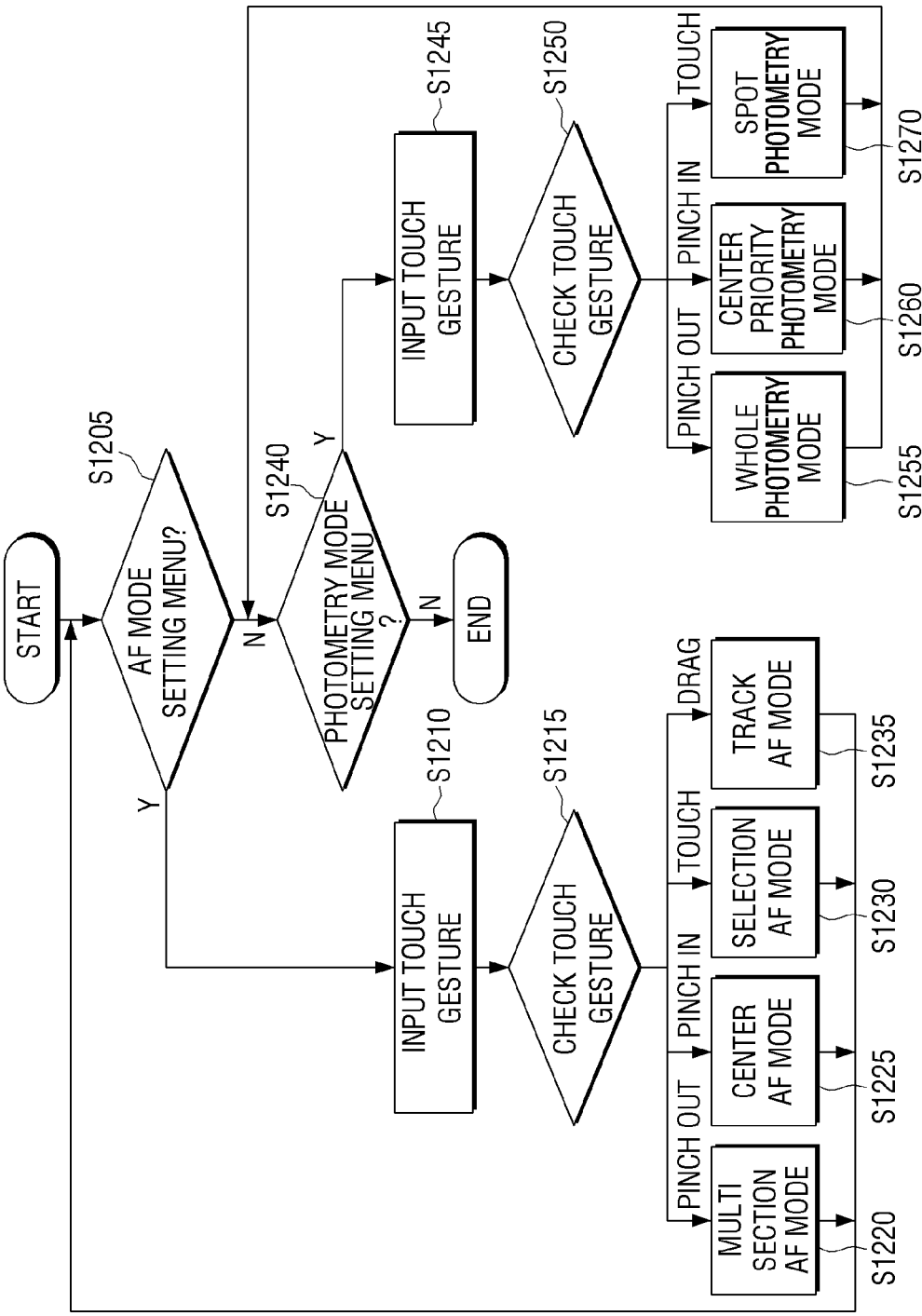
FIG. 12 is a flowchart illustrating a method of selecting an AF mode and a photometry mode according to an exemplary embodiment of the present general inventive concept.

FIG. 12 is a flowchart illustrating a method of selecting an AF mode and a photometry mode in an imaging apparatus according to an exemplary embodiment of the present general inventive concept.

The imaging apparatus determines whether an AF mode setting menu is displayed at operation S1205. As described above, an imaging apparatus may comprise a physical button or display a soft button on a touch screen to select an AF mode or an auto photometry mode. The imaging apparatus may select an AF mode or an auto photometry mode based on the number of times that a user pushes the button.

When an AF mode setting menu is displayed, an imaging apparatus receives a touch gesture at operation S1210. The imaging apparatus checks the input touch gesture at operation S1215. According to an exemplary embodiment, if the touch gesture is a pinch-out gesture, a multi section AF mode is set at operation S1220. If the touch gesture is a pinch-in gesture, a center AF mode is set at operation S1225. If the touch gesture is a single touch gesture, a selection AF mode is set at operation S1230. If the touch gesture is a drag gesture, a track AF mode is set at operation S1235.

A center AF mode or a multi section AF mode may be set as a default AF mode according to a design or user preference. It is possible that an imaging apparatus may generate a user selection AF mode that divides a live view into a plurality of areas and performs AF based on at least one area selected by a user. For example, a user selection AF mode may correspond to a gesture drawing a circle. The aforementioned AF modes and touch gestures are merely examples, and these should not be considered as limiting.

If an AF mode setting menu is not displayed, an imaging apparatus determines whether an auto photometry mode setting menu is displayed at operation S1240. Selecting an AF setting mode or an auto photometry setting mode has been explained above, and thus it is omitted.

When an auto photometry mode setting menu is displayed, an imaging apparatus receives a touch gesture at operation S1245. The imaging apparatus checks the received touch gesture at operation S1250. According to an exemplary embodiment, if the touch gesture is a pinch-out gesture, a whole photometry mode is set at operation S1255. If the touch gesture is a pinch-in gesture, a center priority photometry mode is set at operation S1260. If the touch gesture is a single touch gesture, a spot photometry mode is set at operation S1270.

Imaging apparatus manufacturers may set a whole photometry mode or a center priority photometry mode as a default photometry mode. In some cases, an imaging apparatus may generate a user selection photometry mode that divides a live view into a plurality of areas and performs auto photometry based on at least one area selected by a user. For example, a user selection photometry mode may correspond to a gesture drawing a circle. The aforementioned auto photometry modes and touch gestures are merely examples, and these should not be considered as limiting.

As described above, according to various embodiments of the present general inventive concept, a user can more conveniently select an AF mode and an auto photometry mode. Accordingly, an imaging apparatus can be controlled more easily and simply.

The aforementioned method of controlling a display device according to various embodiments may be implemented as a program and be provided to a display device.

As an example, there may be provided a computer readable medium, which stores therein computer-readable codes as a program to execute a method of displaying a live view generated by an image unit and receiving a touch gesture for the live view, adjusting a focus by setting an auto focus mode corresponding to the touch gesture among a plurality of auto focus modes if the touch gesture is input, and moving a location of a lens to adjust the focus according to the set auto focus mode, or automatically measuring light by setting an auto photometry mode corresponding to the touch gesture among a plurality of auto photometry modes if the touch gesture is input, and measuring intensity of light for a selected area according to the set auto photometry mode.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An imaging apparatus storing information for a plurality of auto focus modes, which are mapped to each type of touch gesture, comprising:
   an image unit having a lens to perform imaging;
   a drive unit to move a location of the lens in the imaging unit to adjust a focus;
      a touch screen to display a live view image generated by the imaging unit and receive a touch gesture for the live view image; and
      a controller configured to determine a type of the touch gesture according to the received touch gesture, set an auto focus mode corresponding to the determined type of the touch gesture among the plurality of auto focus modes, based on the information, in response to the touch gesture being input in an auto focus setting mode, and to control the drive unit to adjust the focus according to the set auto focus mode among the plurality of auto focus modes,
      wherein the controller changes, in response to another type of touch gesture being input, the set auto focus mode to another auto focus mode corresponding to another type of touch gesture among the plurality of auto focus modes, based on the information.

2. The imaging apparatus of claim 1, wherein the controller is further configured to control the drive unit to adjust the focus based on the live view image in an area where the touch gesture is performed and accordinq to the set auto focus mode among the plurality of auto focus modes.

3. The imaging apparatus of claim 2, wherein the controller is further configured to:
   set a multi section auto focus mode among the plurality of auto focus modes, in response to the type of the touch gesture on the live view image being determined to be a pinch-out gesture, and
   control the drive unit to adjust the focus according to the multi section auto focus mode among the plurality of auto focus modes, based on a certain object on the live view image displayed in an area defined by the pinch-out gesture.

4. The imaging apparatus of claim 2, wherein the controller is further configured to:
   set a track auto focus mode among the plurality of auto focus modes, in response to the type of the touch gesture on the live view image being determined to be a drag gesture, and
   control the drive unit to adjust the focus according to the track auto focus mode among the plurality of auto focus modes, while tracking an object defined by the drag gesture.

5. The imaging apparatus of claim 1, wherein the plurality of auto focus modes include a center auto focus mode, a multi section auto focus mode, a track auto focus mode and a selection auto focus mode.

6. An imaging apparatus storing information for a plurality of auto focus modes, which are mapped to each type of touch gesture, comprising:
   an image unit having a lens to perform imaging;
   a drive unit to move a location of the lens in the imaging unit to adjust a focus;
   a touch screen to display a live view image generated by the imaging unit and receive a touch gesture for the live view image; and
   a controller configured to set a multi section auto focus mode based on the information in response to a single-point fix pinch-out gesture being input among the touch gesture in a shooting mode, and to control the drive unit to automatically adjust the focus based on a certain object on the live view image displayed in an area defined by the single-point fix pinch-out gesture,
   wherein the controller shifts an auto focus mode based on the information, in response to the touch gesture being changed.

7. An imaging apparatus storing information for a plurality of auto photometry modes, which are mapped to each type of touch gesture, comprising:
   an image unit having a lens to perform imaging;
   an exposure meter unit to measure intensity of light being incident on the image unit;
      a touch screen to display a live view image generated by the imaging unit and to receive a touch gesture for the live view image; and
      a controller configured to determine a type of the touch gesture according to the received touch gesture, set an auto photometry mode corresponding to the determined type of the touch gesture among the plurality of auto photometry modes based on the information, in response to the touch gesture being input in an auto photometry setting mode, and to control the exposure meter unit to measure intensity of light for a selected area according to the set auto photometry mode among the plurality of auto photometry modes,
      wherein the controller changes, in response to another type of touch gesture being input, the set auto photometry mode to another auto photometry mode corresponding to another type of touch gesture among the plurality of auto photometry modes, based on the information.

8. The imaging apparatus of claim 7, wherein the controller is further configured to:
   set a whole photometry mode among the plurality of photometry modes, in response to the type of the touch gesture on the live view image being determined to be a pinch-out gesture, and
   control the exposure meter unit to measure the intensity of light according to the whole photometry mode among the plurality of photometry modes, the intensity of light being incident on an area defined by the pinch-out gesture.

9. The imaging apparatus of claim 7, wherein the controller further configured to:
   set a center priority photometry mode among the plurality of photometry modes, in response to the type of the touch gesture on the live view image being determined to be a pinch-in gesture, and control the exposure meter unit to measure the intensity of light according to the auto photometry mode among the plurality of auto photometry modes, the intensity of light being incident on a center area pre-set on the live view image.

10. The imaging apparatus of claim 7, wherein the plurality of auto photometry modes include a whole photometry mode, a center priority photometry mode and a spot photometry mode.

11. A method of controlling an imaging apparatus storing information for a plurality of auto focus modes, which are mapped to each type of touch gesture, the method comprising:

displaying a live view image generated by an imaging unit;

receiving a touch gesture for the live view image;

determining a type of the touch gesture according to the received touch gesture;

setting an auto focus mode corresponding to the determined type of the touch gesture among the plurality of auto focus modes based on the information, in response to the touch gesture being input in an auto focus setting mode; and adjusting a focus for the live view image according to the set auto focus mode among the plurality of auto focus modes, wherein adjusting the focus further comprises changing, in response to another type of touch gesture being input, the set auto focus mode to another auto focus mode among the plurality of auto focus modes, based on the information.

12. The method of claim 11, wherein the adjusting the focus comprises moving a location of a lens to adjust the focus based on the live view image in an area where the touch gesture is performed and according to the set auto focus mode among the plurality of auto focus modes.

13. The method of claim 12, wherein:

the setting the auto focus mode comprises setting a multi section auto focus mode among the plurality of auto focus modes in response to the type of the touch gesture on the live view image being determined to be a pinch-out gesture, and the adjusting the focus further comprises moving the location of the lens to adjust the focus according to the multi section auto focus mode among the plurality of auto focus modes, based on a certain object on the live view image displayed in an area defined by the pinch-out gesture.

14. The method of claim 12, wherein:

the setting the auto focus mode comprises setting a track auto focus mode among the plurality of auto focus modes in response to the type of the touch gesture on the live view image being determined to be a drag gesture, and the adjusting the focus further comprises moving the location of the lens to adjust the focus according to the multi section auto focus mode among the plurality of auto focus modes, while tracking an object defined by the drag gesture.

15. The method of claim 11, wherein the plurality of auto focus modes include a center auto focus mode, a multi section auto focus mode, a track auto focus mode and a selection auto focus mode.

16. A method of controlling an imaging apparatus storing information for a plurality of auto focus modes, which are mapped to each type of touch gesture, the method comprising:

displaying a live view image generated by an imaging unit and receiving a touch gesture for the live view image; and adjusting a focus by setting a multi section auto focus mode based on the information in response to a single-point fix pinch-out gesture being input among the touch gesture in a shooting mode, and moving a location of a lens to automatically adjust the focus based on a certain object on the live view image displayed in an area defined by the single-point fix pinch-out gesture, wherein adjusting the focus further comprises shifting an auto focus mode based on the information, in response to the touch gesture being changed.

17. A method of controlling an imaging apparatus storing information for a plurality of auto photometry modes, which are mapped to each type of touch gesture, the method comprising:

displaying a live view image generated by an imaging unit;

receiving a touch gesture for the live view image;

determining a type of the touch gesture according to the received touch gesture;

setting an auto photometry mode corresponding to the determined type of the touch gesture, among the plurality of auto photometry modes based on the information, in response to the touch gesture being input in an auto photometry setting mode; and measuring intensity of light according to the set auto photometry mode among the plurality of auto photometry modes, wherein measuring the intensity of light further comprises changing, in response to another type of touch gesture being input, the set auto photometry mode corresponding to another type of touch gesture among the plurality of auto photometry modes, based on the information.

18. The method of claim 17, wherein:

the setting the auto photometry mode among the plurality of auto photometry modes comprises setting a whole photometry mode among the plurality of photometry modes in response to the type of the touch gesture on the live view image being determined to be a pinch-out gesture, and the measuring the intensity of light comprises measuring the intensity of light according to the auto photometry mode among the plurality of auto photometry modes, the intensity of light being incident on an area defined by the pinch-out gesture.

19. The method of claim 17, wherein:

the setting the auto photometry mode among the plurality of auto photometry modes comprises setting a center priority photometry mode among the plurality of photometry modes in response to the type of the touch gesture on the live view image being determined to be a pinch-in gesture, and the measuring the intensity of light comprises measuring the intensity of light according to the center priority photometry mode among the plurality of auto photometry modes, the intensity of light being incident on a center area pre-set on the live view.

20. The method of claim 17, wherein the plurality of auto photometry modes include a whole photometry mode, a center priority photometry mode and a spot photometry mode.

* * * * *